US007903623B2

(12) United States Patent
Razdan et al.

(10) Patent No.: US 7,903,623 B2
(45) Date of Patent: Mar. 8, 2011

(54) SERVER BASED TECHNIQUE FOR OPTIMIZING CALL SETUP LATENCY FOR GEOGRAPHICALLY DENSE GROUPS

(75) Inventors: Ashu Razdan, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 11/609,987

(22) Filed: Dec. 13, 2006

(65) Prior Publication Data

US 2008/0144536 A1    Jun. 19, 2008

(51) Int. Cl.
- H04W 4/00    (2009.01)
- H04B 7/00    (2006.01)
- H03M 7/00    (2006.01)
- H04L 9/32    (2006.01)

(52) U.S. Cl. ............ 370/338; 455/519; 341/50; 713/169

(58) Field of Classification Search .......... 709/217–229, 709/232; 370/338; 341/50; 455/456, 518–519; 713/169
See application file for complete search history.

(56) References Cited

U.S. PATENT DOCUMENTS

| | | | |
|---|---|---|---|
| 6,128,472 A | 10/2000 | Harel et al. | |
| 6,489,900 B2 * | 12/2002 | Shin et al. | 341/50 |
| 6,876,643 B1 * | 4/2005 | Aggarwal et al. | 370/338 |
| 2002/0086680 A1 * | 7/2002 | Hunzinger | 455/456 |
| 2003/0153341 A1 * | 8/2003 | Crockett et al. | 455/519 |
| 2004/0077364 A1 | 4/2004 | Peng | |
| 2005/0132192 A1 * | 6/2005 | Jeffries et al. | 713/169 |

FOREIGN PATENT DOCUMENTS

| | | |
|---|---|---|
| EP | 1315394 | 5/2003 |
| WO | 02078258 | 10/2002 |

OTHER PUBLICATIONS

International Search Report-PCT/US07/087030, International Search Authority-European Patent Office-Aug. 1, 2008.
Written Opinion-PCT/US07/087030, International Search Authority-European Patent Office-Aug. 1, 2008.
International Preliminary Report on Patentability, PCT/US2007/08030, International Bureau of WIPO, Jun. 25, 2009.

* cited by examiner

*Primary Examiner* — Ian N Moore
*Assistant Examiner* — Kiet Tang
(74) *Attorney, Agent, or Firm* — Robert O'Connell; Raphael Freiwirth

(57) ABSTRACT

A server based method for optimizing call setup latency including updating client location information using at least one application server; identifying and updating parameters including location update information uniquely identifying a sector from which the at least one client is receiving communication service; determining at least one geographically dense call group; choosing at least one designated responder to respond to the at least one call group; selecting a plurality of designated responders as targets for m largest clusters; computing hash outputs of the targets; and performing a logical OR operation on lower order n bits of the hash outputs corresponding to the targets.

19 Claims, 4 Drawing Sheets

SERVER BASED TECHNIQUE FOR OPTIMIZING CALL SETUP LATENCY FOR GEOGRAPHICALLY DENSE GROUPS

BACKGROUND OF THE INVENTION

1. Field

The present invention generally relates towards reducing communication latency. More particularly, the present invention relates to a server based method for optimizing call setup latency for geographically dense groups.

2. Background

Advances in technology have resulted in smaller and more powerful personal computing devices. For example, there currently exist a variety of portable personal computing devices, including wireless computing devices, such as portable wireless telephones, laptops, personal digital assistants (PDAs) and paging devices that are each small, lightweight, and can be easily carried by users. A wireless device is any device that can communicate with other devices without being physically attached to them. Most wireless devices communicate with each other through radio frequencies.

More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

However, these smaller and more powerful personal computing devices are typically severely resource constrained. For example, the screen size, amount of available memory and file system space, amount of input and output capabilities and processing capability may each be limited by the small size of the device. Due to severe resource constraints, it is often typically desirable, for example, to maintain a limited size and quantity of software applications and other information residing on such remote personal computing devices (client devices).

Some of the personal computing devices utilize an application programming interface (API) or application programming interfaces (APIs), sometimes referred to as runtime environments and software platforms, that are installed onto their local computer platform and which are used, for example, to simplify operations of such devices, such as by providing generalized calls for device specific resources. An API is a set of routines used by an application program to direct the performance of procedures used by the computer's operating system.

Further, some APIs are also known to provide software developers the ability to create software applications that are fully executable on such devices. In addition, some of such APIs are known to be operationally located between the computing device system software and the software applications such that the computing device system software and the software applications such that the computing device computing functionality is made available to the software application without requiring the software developer to have the specific computing device system source code. Further, some APIs are known to provide mechanisms for secure communications between such personal devices (i.e., clients) and remote devices (i.e., servers) using secure, cryptographic information.

Examples of such APIs, some of which are discussed in more detail below, include versions of the Binary Runtime Environment for Wireless® (BREW®) developed by QUALCOMM, Inc., of San Diego, Calif. BREW® can operate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security, and application distribution functionality, and the client performs, for example, application execution, security and user interface functionality.

The foregoing description of the related art is merely intended to provide an overview of wireless devices and some of the known uses of APIs and as an introduction to the BREW® platform, which can be used in various embodiments of the invention. However, the invention is not to be construed as being limited to a specific physical configuration, implementation, operating platform or environment.

In a group call communication system, the reduction of latency is an important design goal which directly translates into end user customer satisfaction and utility. Some examples of sources of latency in a wireless network follow. Channel assignment latency is a delay in assigning and initializing a traffic channel for the user's communication needs. Paging latency is a delay incurred while waiting for the user's mobile device to respond to a page in an appropriate paging channel slot. Over-the-air transmission is another source of latency as the calls originate, travel and are received over a communication infrastructure.

In addition to these types of delays, there are delays that may also occur at the group call communication server. Some examples of server delays are user request processing and server component communication.

In a Push to Talk (PTT) system, all of the various types of delays contribute to PTT latency. PTT latency is the delay between the time the user requests a floor, by pressing the PTT button, and the time the user receives confirmation from a PTT application server that the call has been established and the floor is available. With the exception of paging latency, the delays described above also contribute to end-to-end media latency, which is the delay between the time the originator starts speaking and the time when the targets actually hear the originator's speech.

Therefore, it is desirable and advantageous to provide a method for reducing latency in a group communication system.

During call setups for geographically dense groups and multicast groups, a high number of access probe collisions occur as multiple targets registered in the same sector attempt to respond to the call request at the same time. These collisions cause an increase in call setup times. There is a need for a method and system to avoid these collisions at the application layer.

SUMMARY OF THE INVENTION

Exemplary embodiments of the present invention are directed towards a server based technique for optimizing call setup latency for geographically dense groups.

Accordingly, one embodiment of the invention is a server based method for optimizing call setup latency including updating client information using at least one server; identifying and updating parameters uniquely identifying from where at least one client is receiving communication service; determining at least one call group; choosing at least one designated responder to respond to the at least one call group; selecting a plurality of designated responders as targets; computing data outputs of the targets; and performing logical operations on selected bits of the data outputs corresponding to the targets.

Another embodiment of the invention is a server based method for optimizing call setup latency including updating client location information using at least one application server; identifying and updating parameters including location update information uniquely identifying a sector from which at least one client is receiving communication service; determining at least one geographically dense call group; choosing at least one designated responder to respond to the at least one call group; selecting a plurality of designated responders as targets for m largest clusters; computing hash outputs of the targets; and performing a logical OR operation on lower order n bits of the hash outputs corresponding to the targets.

Another embodiment of the invention is a method for optimizing call setup latency including selecting a target at random; computing a hash of a the target's user address including at least one of the following: an application layer identifier; a target IP address; or a subnet address; and responding if a broadcast call request that is logically ORed with a hash masks its own computed hash.

Another embodiment of the invention is an apparatus for optimizing call setup latency including logic configured to update client location information using at least one application server; logic configured to identify and update parameters including location update information uniquely identifying a sector from which the at least one client is receiving communication service; logic configured to determine at least one geographically dense call group; logic configured to choose at least one designated responder to respond to the at least one call group; logic configured to select a plurality of designated responders as targets for m largest clusters; logic configured to compute hash outputs of the targets; and logic configured to perform a logical OR operation on lower order n bits of the hash outputs corresponding to the targets.

Another embodiment of the invention is an apparatus for optimizing call setup latency including logic configured to select a target at random; logic configured to compute a hash of a the target's user address including at least one of the following: an application layer identifier; a target IP address; or a subnet address; and logic configured to respond if a broadcast call request that is logically ORed with a hash masks its own computed hash.

BRIEF DESCRIPTION OF THE DRAWINGS

A more complete appreciation of embodiments of the invention and many of the attendant advantages thereof will be readily obtained as the same becomes better understood by the reference to the following detailed description when considered in connection with the accompanying drawings which are presented solely for illustration and not limitation of the invention, and in which.

DETAILED DESCRIPTION OF THE INVENTION

Various embodiments of the invention are disclosed in the following description and related drawings directed to specific embodiments of the invention. Alternate embodiments may be devised without departing from the spirit and scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on a computing device. One such runtime environment (API) is the Binary Runtime Environment for Wireless® (BREW®) software previously discussed. However, one or more embodiments of the invention can be used with other types of runtime environments (APIs) that, for example, operate to control the execution of applications on wireless client computing devices.

The following techniques and mechanisms are directed to implementing methods and components of mobile electronic device to interoperate with an input device via a standard earphone/microphone connector. In general, the mobile electronic device includes an interface to support data transfer between the mobile electronic device and the input device via the standard earphone/microphone connector. This interface can be implemented in hardware and/or software. Specific implementations and embodiments of this general concept are described below.

Figure 1:
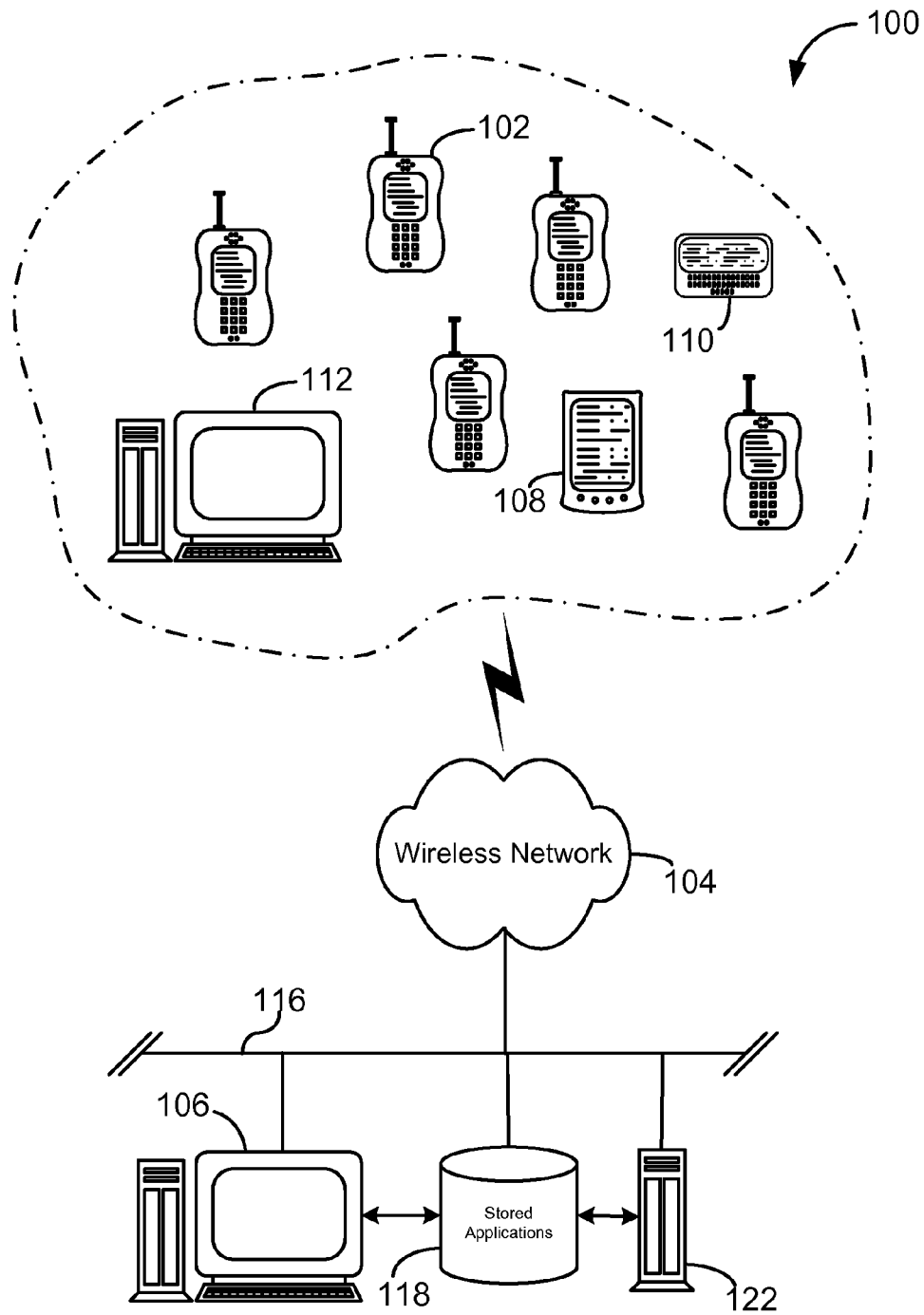
FIG. 1 is an exemplary diagram of a wireless network architecture that supports client devices and servers in accordance with at least one embodiment of the invention.

FIG. 1 illustrates a block diagram of one exemplary embodiment of a wireless system 100 in accordance with at least one embodiment of the invention. System 100 contains client devices, such as cellular telephone 102, in communication across a wireless network 104 with at least one application download server (ADS) 106 that selectively transmits software applications and components to wireless devices across a wireless communication portal or other data access to the wireless network 104. As shown in FIG. 1, the wireless (client) device can be a cellular telephone 102, a personal digital assistant 108, a pager 110, which is shown here as a two-way text pager, or even a separate computer platform 112 that has a wireless communication portal. This separate computer platform 112 may be fixed (e.g. desktop) or mobile (e.g. laptop).

The various embodiments of the invention can thus be realized on any form of client device or wireless devices including a wireless communication portal of having wireless communication capabilities, including without limitation, wireless modems, PCMCIA cards, personal computers, access terminals, telephones, or any combination or subcombination thereof.

The application download server (ADS) 106 is shown here on a network 116 with other computer elements in communication with the wireless network 104. There can be a standalone server 122, and each server can provide separate services and processes to the client devices 102, 108, 110 and 112 across the wireless network 104. There is preferably also at least one stored application database 118 that holds the software applications that are downloadable by the wireless devices 102, 108, 110 and 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality. Further, not all elements (e.g., pager 110, ADS 106, database 118, etc.) illustrated are necessarily used in all of the different embodiments of the invention that may be implemented.

Figure 2:
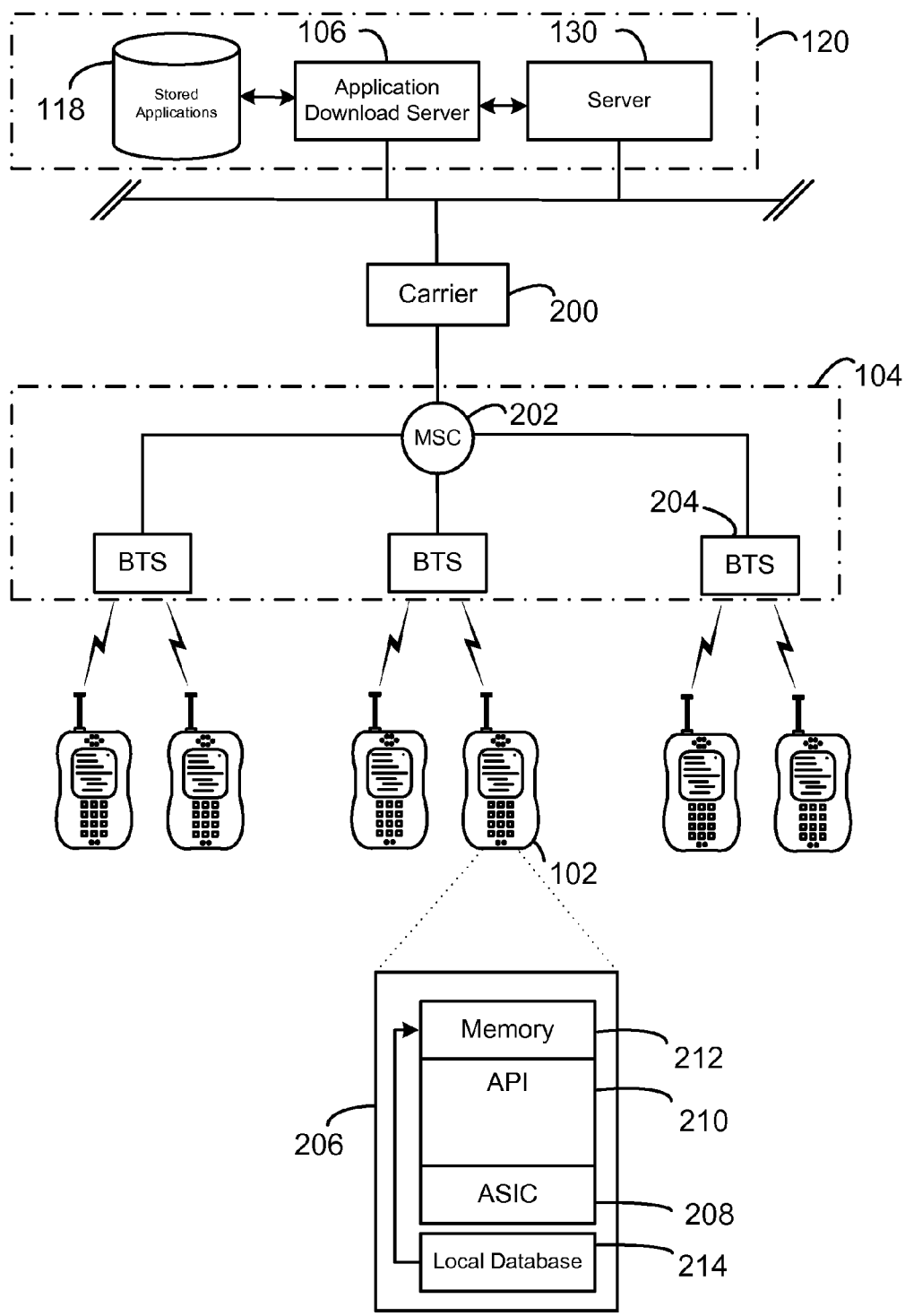
FIG. 2 is a more detailed exemplary diagram of a wireless network architecture that supports the client devices and servers in accordance with at least one embodiment of the invention.

In FIG. 2, a block diagram is shown that more fully illustrates system 100, including the components of the wireless network 104 and the interrelation of the elements of the exemplary embodiments of the invention. System 100 is merely exemplary and can include any system that allows remote client devices, such as wireless client computing devices 102, 108, 110 and 112 to communicate over-the-air between and among each other and/or between and among components connected via a wireless network 104, including, without limitation, wireless network carriers and/or servers. The application download server 106 and the stored application database 118, along with any other servers such as ad display server 130 which are used to provide cellular telecommunications services, communicate with a carrier network, through a data link, such as the Internet, a secure LAN, WAN, or other network. In the embodiment shown, a server 120 can include the application download server 106, ad dispatch server 130 and the stored application database 118. The application download server 106, server 130 and the stored application database 118 are illustrated as independent devices in this embodiment. However, these devices can also be integrated into one common server or the functionality of one or more may be distributed over multiple devices, as will be appreciated by those skilled in the art.

The carrier network 200 controls messages (typically sent as data packets) sent to a messaging service controller (MSC) 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations (BTS) 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service (SMS), UDP datagrams, or other over-the-air (OTA) methods known in the art.

The client device, (here a wireless client computing device), such as a cellular telephone 102, has a computer platform 206 that can receive and execute software applications and/or commands transmitted form the application download server 106, ad dispatch server 130 and/or server 120. The computer platform 206 can include an application specific integrated circuit (ASIC) 208, or other processor, microprocessor, logic circuit, or other data processing device. The ASIC 208 or other processor executes the API 210 layer that interfaces with any resident programs in the memory 212 of the wireless device. The memory 212 can be comprised of read-only or random-access memory (RAM and ROM), EEPROM, flash cards, or any memory common to computer platforms. The computer platform 206 also includes a local database 214 that can hold applications not actively used in memory 212. The local database 214 is typically a flash memory cell, but can be any secondary storage device as know to those skilled in the art, such as magnetic media, EPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications downloaded from the application download server 106. The software applications may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to ads communicated between a client device and a server. The client computing device can be serviced by at least one remote server with respect to at least such ads. Some examples of "wireless computing devices" which may be used in accordance with various embodiments of the present invention includes cellular telephones or other wireless communication units, PDAs, laptops, paging devices, navigation devices (e.g., GPS-based systems), handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Figure 3:
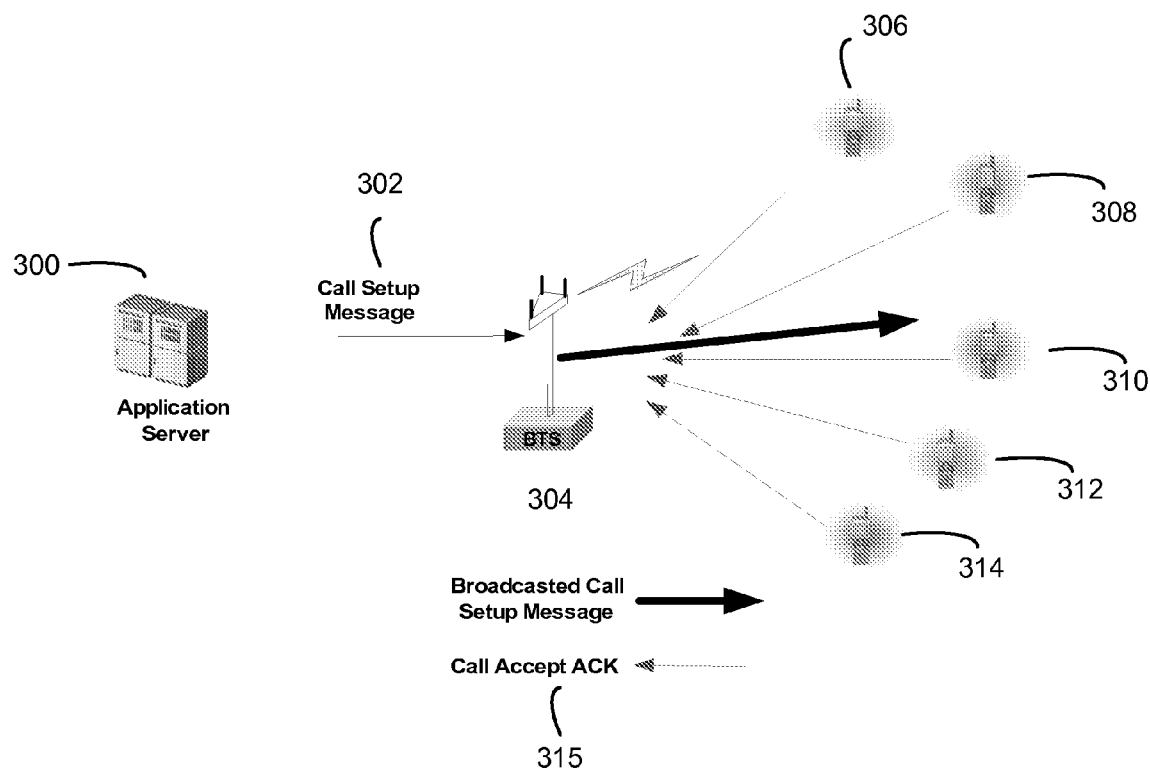
FIG. 3 is an exemplary diagram illustrating an ACK explosion.

FIG. 3 illustrates an example of an ACK explosion. An application server 300 sends a call setup message 302 to a base station transceiver (BTS) 304. The BTS 304 broadcasts a call setup message 305 to a group of client devices (the handsets 306, 308, 310, 312 and 314 shown in FIG. 3). When all of the client devices attempt to respond at the same time or at nearly the same time (call accept ACK 315), there is an increase in the number of collisions on the access channel.

The phenomenon shown in FIG. 3 causes an increase in the call setup times as the response to the call setup message is delayed. During call setups for geographically dense groups and multicast groups a high number of access probe collisions occur as multiple targets registered in the same sector attempt to respond to the call request at the same time. These collisions cause an increase in call setup times. The application layer scheme proposed herein potentially eliminates the collision probability by having the application server choose designated responders to these large group calls.

The following will describe an application layer optimization that helps minimize the number of collisions during call setups for geographically dense groups. When an application server attempts a call setup to multiple targets (e.g. a push-to-talk group communication network) in different sectors and the targets all attempt to respond simultaneously, numerous collisions will occur depending upon the geographic density of the group.

Figure 4:
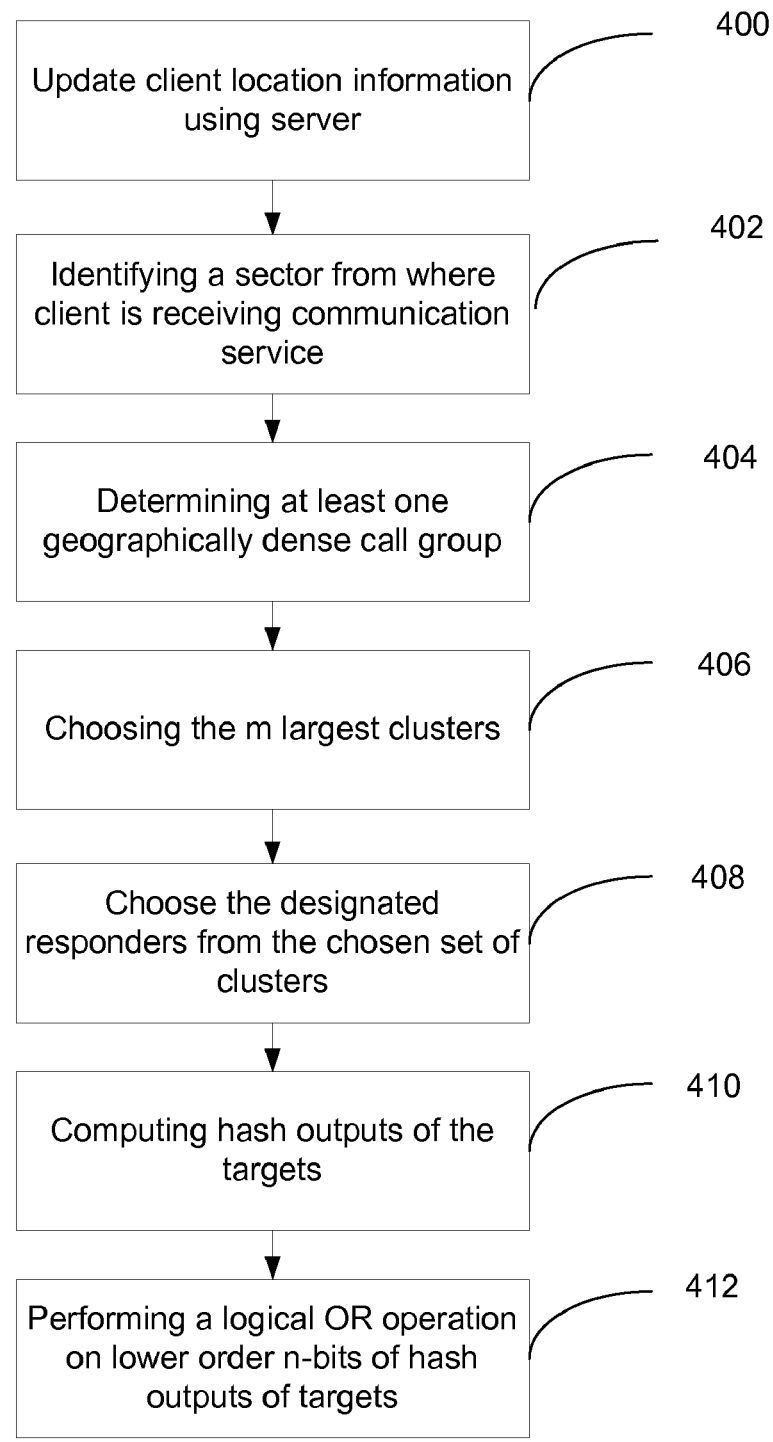
FIG. 4 is an exemplary diagram illustrating a method in accordance with at least one embodiment of the invention.

FIG. 4 illustrates an exemplary method for optimizing call setup latency implementing one embodiment of the present invention. Client location information is updated using at least one application server 400. Parameters are identified and updated including location update information uniquely identifying a sector from which the at least one client is receiving communication service 402. At least one geographically dense call group is determined 404. The m largest clusters are then chosen 406. The designated responders are chosen from the chosen set of clusters 408. Hash outputs of the targets are computed 410 and a logical OR operation is performed on lower order n bits of the hash outputs corresponding to the targets 412

The server maintains state for the set of predefined groups that are likely to be geographically dense. The server can accumulate different types of group and target information based upon the data obtained when each target (e.g. phone or communication device) registers with the application server. Those skilled in the art will appreciate that multicast groups will also benefit from the methods described herein.

When a client registers with the application server, they include parameters that help uniquely identify the sector from which the client is receiving communication service, such as CDMA service (e.g. System ID (SID), Network ID (NID), Carrier Identifier, pilot PN offset).

The client can additionally include pilot strength as an indication of physical proximity with the base station. It should be noted that as access power is normalized to take this into account, physical proximity may not be representative of the access probe signal quality and consequently the use of physical proximity is made optional.

The server maintains state (e.g. SID, NID) for members of all geographically dense predefined groups. For each group, the server computes clusters of clients with the same <SID, NID> pair and selects exactly one client per cluster as the designated responder for that cluster.

When the server needs to set up a geographically dense group call, it selects the designated responders for the m largest clusters and computes a hash of these targets <user address> and broadcast performs a logical OR operation on the low order n bits (n=16 suggested) bits of hash outputs. We suggest that the value of m be small in order for the time complexity to be small. In order to make this step less computationally expensive, the selection may be random or based on the pilot strength measurement or some other heuristic.

The use of the hash of these targets reduces the computational overhead required to handle the plurality of targets in the communication network. The following example is provided. Let us assume that the server has the following <SID, NID, HASH> from 10 devices. It should be noted that both the devices and the server know the hashed values as both of them hash the same input value (known to both) using the same hash algorithm (e.g. MD5).

```
 1. <1, 1, 4324>
 2. <1, 2, 6553>
 3. <2, 1, 7722>
 4. <3, 1, 43456>
 5. <1, 1, 25232>
 6. <1, 1, 46536>
 7. <1, 1, 5653>
 8. <1, 1, 63434>
 9. <1, 1, 34236>
10. <1, 1, 23423>
```

The server deduces that <1,1> is a hotspot, and chooses the designated responder to be device number 7. Also, for reliability, the devices advertising different <SID,NID> pairs are included in the OR-ing operation. And the final identifier is:

```
6553 (for device 2) <Logical OR> 7722 (for device 3) <Logical OR> 43456 (for device 6)
0001100110011001 OR 0001111000101010 OR 1010100111000000
= 1011111111111011 = 49147 (decimal)
```

When device 2 gets this identifier (49147) in the message, it does the computation: 6553 AND 49147 which yields 6553 so it goes ahead and responds. However, from all the devices in the cluster <1,1>, only device 6 gets this right.
43456 AND 49147=43456
For device 9, 34236 AND 49147=34232 which is not the same as 34236, and so it does not respond.

The server then includes this n-bit output (ANNOUNCE_IDENT which is the hashed user addresses of the designated responders) corresponding to the designated responders of m largest clusters for that group in the call setup (announcement) message.

When the targets receive the call setup message, they compute the logical AND operation on the number included in the announcement message and the hash of their own user address.

If the following expression is true, the client goes ahead and responds to the announcement without any extra delay in the application layer.

```
ADDR_HASH = HASH (user address)
ADDR_HASH && ANNOUNCE_IDENT == ADDR_HASH
```

One example of a well known HASH( ) operator are the MD5 algorithms.

If the above condition in the expression is not met, the client waits for a deterministic amount of time equal to the transmission time of an access probe containing the response to the announcement. Doing this significantly reduces the number of access collisions during group call setups.

Several exemplary scenarios follow. An application server randomly selects one target, computes a hash of the targets <user address> and broadcasts the lower 8 bits of that hash to all targets.

Each target checks to see if the broadcast ANNOUNCE's hash matches its own and if so, applies the algorithm for responding immediately to or after a delay. It is an advantage that this delay be kept at a minimum. This minimum delay is based on physical layer capabilities. For example, if the base station can demodulate access probes (from multiple devices) which overlap, but are offset by a certain number of slots (or time), then that time should be used for this delay calculation. One can substitute <user address> with <target IP address>, <target EV-DO subnet address>, and any other obvious, unique addresses that the server already knows about or could already know about for other reasons. Any identifier the server uses to store the identity of the device can be used for this calculation. For example, even an email address in its ASCII form is a bit sequence that can be hashed to a bit sequence of a fixed length. Also, the hashing is done to provide a good randomization, which is expected to increase the effectiveness of the algorithm, For example, two IP addresses 127.24.53.22 and 127.24.53.33, if unhashed, could lead to the same identifier if the first three octets are used in calculation. However, if these two addresses are hashed any 3 octets, would likely be different.

Further, the arrangement of the logic elements is merely for the convenience of illustration and should not be construed as limiting embodiments of the invention. As will be appreciated by those skilled in the art, the functionality of the logic elements described herein may be integrated into one element or distributed as desired among various hardware and software elements.

Those skilled in the art will appreciate that there is no particular order of performing and executing the method functional blocks intended or implied in the preceding description. The foregoing methods discussed above can be used by themselves or in any combination thereof to achieve the same objective.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary or tertiary media. The media may comprise, for example, RAM accessible by, or residing within, the client device and/or server. Whether contained in RAM, a diskette, or other secondary storage media, the instructions may be stored on a variety of machine-readable data storage media, such as direct access storage device (DASD) storage (e.g., a conventional "hard drive" or a RAID array), magnetic tape, electronic read-only media (e.g., ROM, or EEPROM), flash memory cards, an optical storage device (e.g. CD-ROM, WORM, DVD, digital optical tape), paper "punch" cards, or other suitable data storage media including digital and analog transmission media.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described in the singular, the plural is contemplated unless the limitation to the singular is explicitly stated.

The invention claimed is:

1. A server based method for optimizing call setup latency comprising:
   updating client information using at least one server;
   identifying and updating parameters uniquely identifying from where at least one client is receiving communication service;
   determining, by the at least one server, at least one call group;
   choosing, by the at least one server, at least one designated responder from the at least one call group to respond for the at least one call group;
   selecting a plurality of designated responders as targets such that a total number of responses to a call setup message is reduced;
   computing hash outputs of the targets;
   performing a logical OR operation on selected bits of the hash outputs corresponding to the targets; and
   receiving a response from a target only when, up receiving a call setup message, the target computes a logical AND operation on a number included in an announcement message and a hash of the target's own user address and the following expression is true: (target's own user address)=(target's own user address) AND (the number included in the announcement message), wherein the number included in the announcement message is the result of said performing the logical OR operation on the selected bits of the hash outputs corresponding to the targets.

2. A server based method for optimizing call setup latency comprising:
   updating client location information using at least one application server;
   identifying and updating parameters including location update information uniquely identifying a sector from which at least one client is receiving communication service;
   determining, by the at least one application server, at least one geographically dense call group;
   choosing, by the at least one application server, at least one designated responder from the at least one geographically dense call group to respond on behalf of the at least one call group;
   selecting a plurality of designated responders as targets for m largest clusters such that a total number of responses to a call setup message is reduced;
   computing hash outputs of the targets;
   performing a logical OR operation on lower order n bits of the hash outputs corresponding to the targets; and
   receiving a response from a target only when, up receiving a call setup message, the target computes a logical AND operation on a number included in an announcement message and a hash of the target's own user address and the following expression is true: (target's own user address)=(target's own user address) AND (the number included in the announcement message), wherein the number included in the announcement message is the result of said performing the logical OR operation on the lower order n bits of the hash outputs corresponding to the targets.

3. The method of claim 2, wherein the server maintains informational parameters for all members of geographically dense predefined groups and the server computes clusters of clients with the same informational parameters and selects exactly one client per cluster as the designated responder for that cluster.

4. The method of claim 2, wherein the server maintains state (SID, NID) for all members of geographically dense predefined groups and the server computes clusters of clients with the same <SID, NID> pair and selects exactly one client per cluster as the designated responder for that cluster.

5. The method of claim 2, wherein the server includes a plurality of n-bit outputs which are the hashed user addresses of a plurality of designated responders.

6. The method of claim 2, wherein the server includes an announcement message which is the hashed user address of a designated responder.

7. The method of claim 5, wherein the announcement message is an n-bit output or plurality of n-bit outputs of a designated responder or responders.

8. The method of claim 2, wherein a large cluster indicates that a large number of access terminals (AT) are members of a single geographically dense group residing in the same sector or collision domain.

9. The method of claim 2, wherein the client information comprises at least a System ID (SID) and a Network ID (NID).

10. The method of claim 2, wherein the client information comprises a communications network parameter.

11. The method of claim 2, wherein the client information comprises a carrier identifier.

12. The method of claim 2, wherein the client information comprises pilot signal related information.

13. The method of claim 2, wherein the client information comprises a pilot PN Offset.

14. The method of claim 2, wherein the server maintains state for a set of predefined groups that are likely to be geographically dense.

15. The method of claim 10, wherein the server includes the n bits of the hash outputs.

16. The method of claim 2, wherein if the expression is not true, the target waits a deterministic amount of time equal to a transmission time of an access probe containing a response to the announcement message.

17. An apparatus comprising:
at least one processor;
a memory storing thereon logic executable by the at least one processor to:
update client location information using at least one application server;
identify and update parameters including location update information uniquely identifying a sector from which the at least one client is receiving communication service;
determine at least one geographically dense call group;
choose at least one designated responder from the at least one geographically dense call group to respond for the at least one call group;
select a plurality of designated responders as targets for m largest clusters such that a total number of responses to a call setup message is reduced;
compute hash outputs of the targets;
perform a logical OR operation on lower order n bits of the hash outputs corresponding to the targets; and
receive a response from a target only when, up receiving a call setup message, the target computes a logical AND operation on a number included in an announcement message and a hash of the target's own user address and the following expression is true: (target's own user address)=(target's own user address) AND (the number included in the announcement message), wherein the number included in the announcement message is the result of said performing the logical OR operation on the lower order n bits of the hash outputs corresponding to the targets.

18. A non-transitory computer readable storage medium embodying a method in a group communication server in a wireless communication system, the method comprising storing thereon computer readable instructions for:
updating client location information using at least one application server to provide a location update while a client moves from one sector to another;
identifying and updating parameters including location update information uniquely identifying a sector from which a client is receiving communication service;
determining at least one geographically dense call group;
choosing, by the group communication server, at least one designated responder from the at least one call group to respond on behalf of the at least one call group in response to a call setup message;
computing clusters of clients with related network and system state parameters;
selecting, by the group communication server, a client per cluster as a designated responder for that cluster such that a total number of responses to the call setup message is reduced and when the server needs to set up a geographically dense group call a random number is included corresponding to the designated responder for that group in a call setup message;
selecting a plurality of designated responders as targets for the m largest clusters;
computing hash outputs of these targets;
performing a logical OR operation on lower order n bits of the hash outputs; and
receiving a response from a target only when, up receiving a call setup message, the target computes a logical AND operation on a number included in an announcement message and a hash of the target's own user address and the following expression is true: (target's own user address)=(target's own user address) AND (the number included in the announcement message), wherein the number included in the announcement message is the result of said performing the logical OR operation on the lower order n bits of the hash outputs corresponding to the targets.

19. An apparatus comprising:
means for updating client location information using at least one application server;
means for identifying and updating parameters including location update information uniquely identifying a sector from which at least one client is receiving communication service;
means for determining, by the at least one application server, at least one geographically dense call group;

means for choosing, by the at least one application server, at least one designated responder from the at least one geographically dense call group to respond on behalf of the at least one call group;

means for selecting a plurality of designated responders as targets for m largest clusters such that a total number of responses to a call setup message is reduced;

means for computing hash outputs of the targets;

means for performing a logical OR operation on lower order n bits of the hash outputs corresponding to the targets; and means for receiving a response from a target only when, up receiving a call setup message, the target computes a logical AND operation on a number included in an announcement message and a hash of the target's own user address and the following expression is true: (target's own user address)=(target's own user address) AND (the number included in the announcement message), wherein the number included in the announcement message is the result of said performing the logical OR operation on the lower order n bits of the hash outputs corresponding to the targets.

* * * * *